United States Patent [19]
Andreis

[11] Patent Number: 5,931,486
[45] Date of Patent: Aug. 3, 1999

[54] SPRUNG AXLE FOR VEHICLES

[75] Inventor: Alessandro Andreis, Mirano, Italy

[73] Assignee: CARRARO S.p.A., Padua, Italy

[21] Appl. No.: 08/856,168

[22] Filed: May 14, 1997

[51] Int. Cl.[6] ...................................... B60G 3/00
[52] U.S. Cl. ................................. 280/124.139; 180/905
[58] Field of Search .................... 280/124.139, 124.117, 280/124.113, 124.111; 180/253, 254, 905

[56] References Cited

U.S. PATENT DOCUMENTS

| | | | |
|---|---|---|---|
| 3,166,340 | 1/1965 | Rusconi | 280/124.139 |
| 3,380,754 | 4/1968 | Rauls | 280/124.139 |
| 4,733,744 | 3/1988 | Glaze | 280/124.113 |
| 4,848,789 | 7/1989 | Timoney et al. | 280/124.139 |

Primary Examiner—Kenneth R. Rice
Attorney, Agent, or Firm—Sughrue, Mion, Zinn, Macpeak & Seas, PLLC

[57] ABSTRACT

A sprung axle is described comprising a central body which is suitable for attachment in a fixed or oscillating manner to a supporting structure of the vehicle and to which are connected two side bodies by means of respective independent-wheel suspensions including suspension arms articulated by one of their ends to the respective side body and by the opposite end to the central body and also shock-absorbing and/or spring-suspension means between the corresponding side body and the central body, the shock-absorbing and/or spring-suspension means and the suspension arms being otherwise substantially detached from the supporting structure of the vehicle.

8 Claims, 4 Drawing Sheets

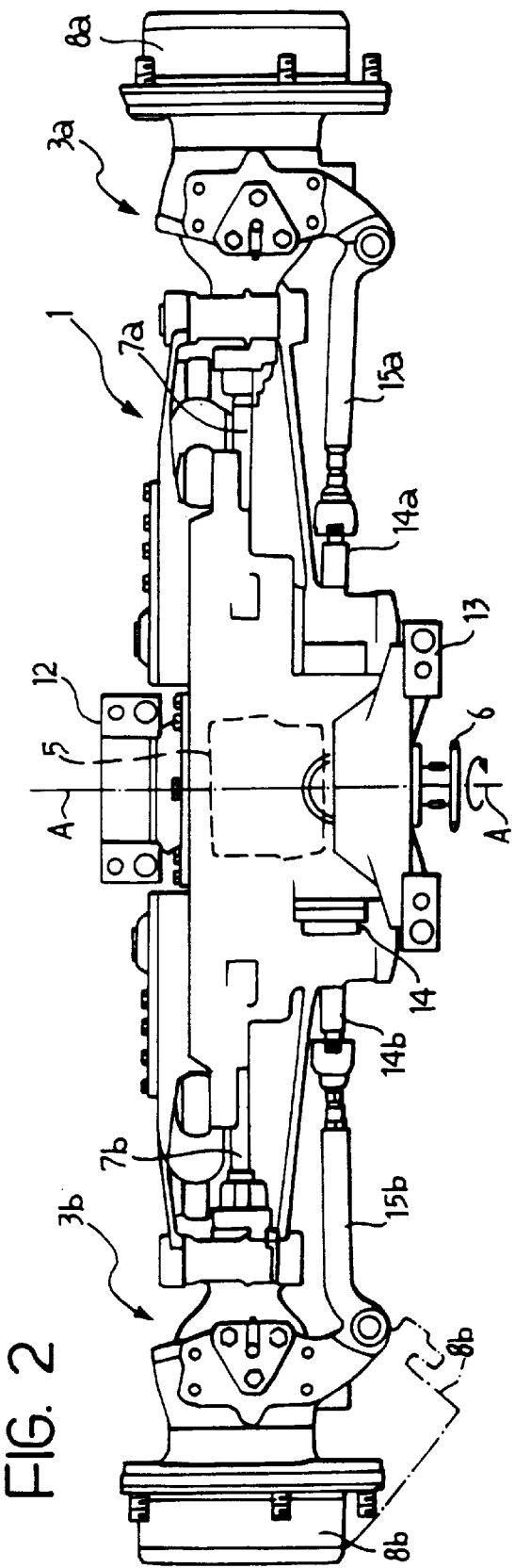
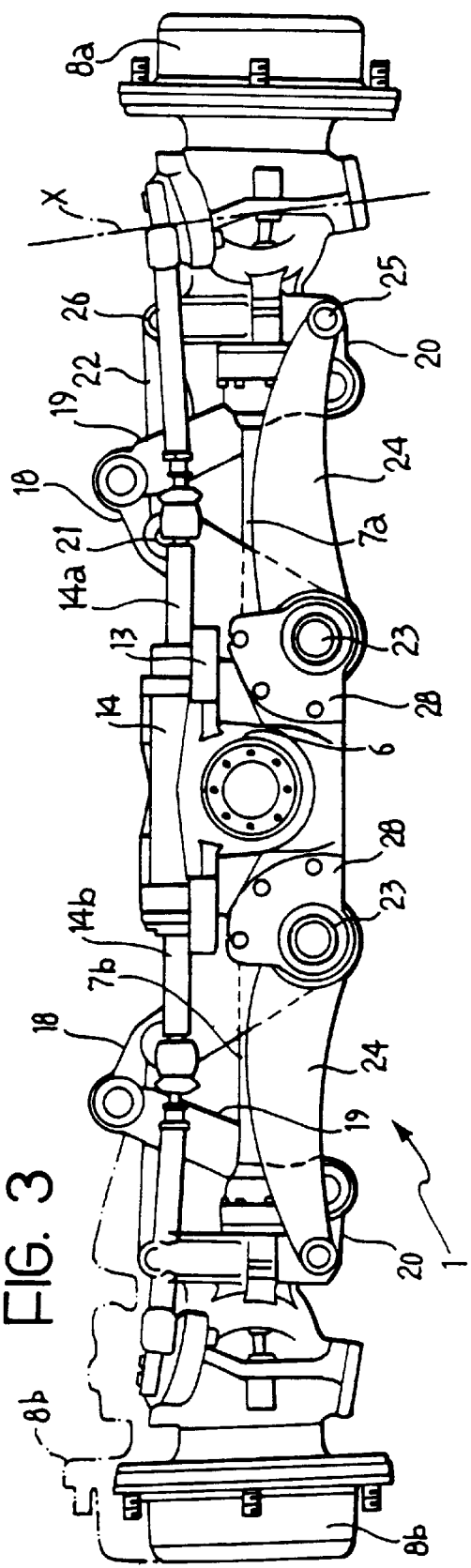
FIG. 2
FIG. 3

SPRUNG AXLE FOR VEHICLES

BACKGROUND OF THE INVENTION

The present invention relates to a sprung axle for vehicles having a central body, means for attaching the central body to a supporting structure of the vehicle, a side body for each wheel, each side body including a respective wheel hub and means for connecting each side body to the central body.

Axles of this type intended for agricultural tractors are known from German Patents Nos. 3834693, 3901757, 3937938 and from Italian Patent Application PD92A000010.

These configurations of axles, in addition to requiring specific adaptation to the supporting structure of the vehicle, involve further, special adaptation of the components associated with the shaft for transmitting the drive from the gearbox or the drive distribution box.

For example, in the type of axle illustrated in German Patent No. 3834693 it is necessary to provide a ball joint oscillating anchorage of particular strength situated in the lower portion of the supporting structure of the tractor and also to provide special arrangements on the tractor for the attachment of an equaliser structure by means of which the axle and the spring suspension are connected to one another and to the above-mentioned supporting structure.

SUMMARY OF THE INVENTION

The problem underlying the invention is to provide a sprung axle which can be readily mounted on means normally equipped with unsprung axles and transmissions.

This problem is solved by the invention by means of an axle produced in accordance with the Claims, which follow.

The axle is characterised in that the central portion thereof retains the same characteristics of mountability as an unsprung axle with which vehicles such as agricultural tractors are normally equipped and is mounted in oscillating or non-oscillating manner relative to an axis parallel to the longitudinal axis of the vehicle, while the side portions form a double wishbone suspension which is hinged, on the one hand, to the central structure described above, and, on the other hand, to the part supporting the wheel hubs.

This configuration provides, by means of resilient or hydraulic elements, for a spring suspension which acts independently between the central portion and each wheel; if a hydraulic cylinder is used for the spring suspension, this configuration also enables the position of the centre of gravity of the vehicle relative to the axis of rotation of the wheels to be predetermined or varied, even when the vehicle is in motion.

BRIEF DESCRIPTION OF THE DRAWINGS

The characteristics and advantages of the invention will become clear from the following detailed description of two embodiments illustrated by way of non-limiting example with reference to the appended drawings in which:

FIGS. 2 and 3 are, respectively, a plan view and an elevation of the whole of a sprung axle of FIG. 1;

DETAILED DESCRIPTION OF THE INVENTION

Figure 1:
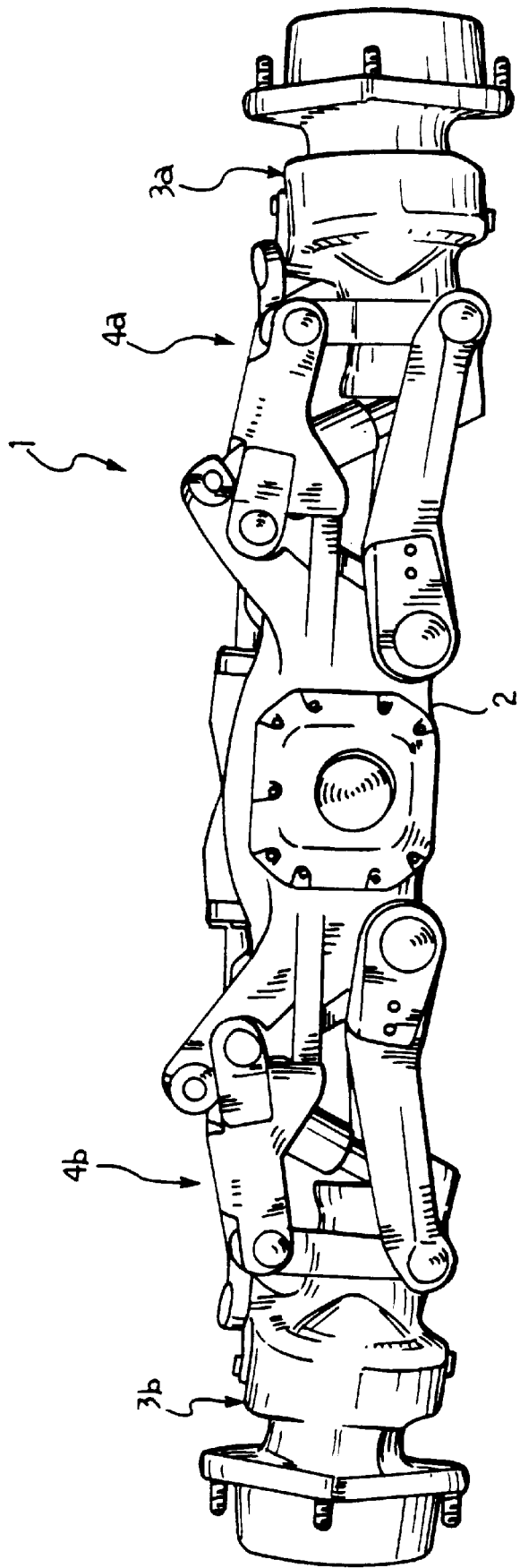
FIG. 1 is a perspective front view of an axle produced in accordance with the present invention.

In the drawings, an axle produced in accordance with the present invention is generally indicated 1. The axle 1 comprises a central body 2 defining a closed box-shaped structure, and two side bodies 3a, b attached to the central body 2 at opposite sides thereof by means of respective so-called "independent-wheel" suspensions 4a, b.

The closed box-shaped structure of the central body 2 is suitable for containing a differential unit 5 of which the pinion (not shown) is splined to a drive input shaft of which a drive input flange 6 is shown. The differential unit 5 is arranged for the operation of two respective half-shafts 7a, b, each of which is to rotate a respective wheel hub 8a, b of the respective side bodies 3a, b.

The central body 2 comprises two pin-like cylindrical extensions 10, 11 which are aligned on the same axis A and are to be accommodated in respective supports 12, 13 conventionally arranged on the supporting structure of an agricultural tractor or equivalent self-propelled means for mounting conventional unsprung or "rigid" axles. Thus, the axle is mounted to oscillate about the axis A on the supporting structure of the tractor. It is, however, provided that the axle can be mounted in a non-oscillating manner.

Because the axle 1 shown in the drawings is a steering axle, in addition to a driving axle, a steering actuator 14 is also fastened to the box-shaped body 2 and its opposing rods 14a, b are connected by means of respective steering arms 15a, b to the two side bodies 3a, b in the manner explained hereinafter.

Figure 5:
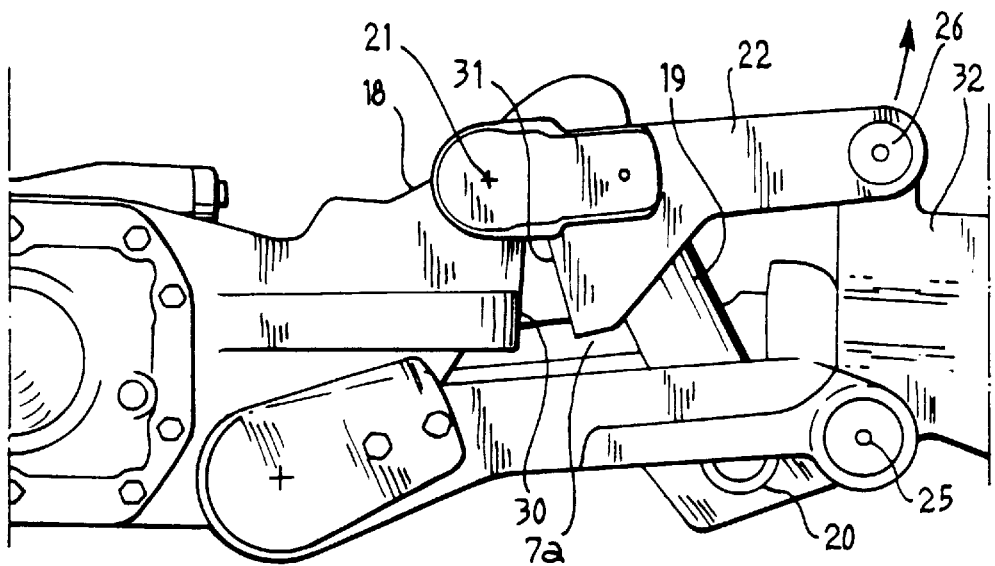
Figure 6:
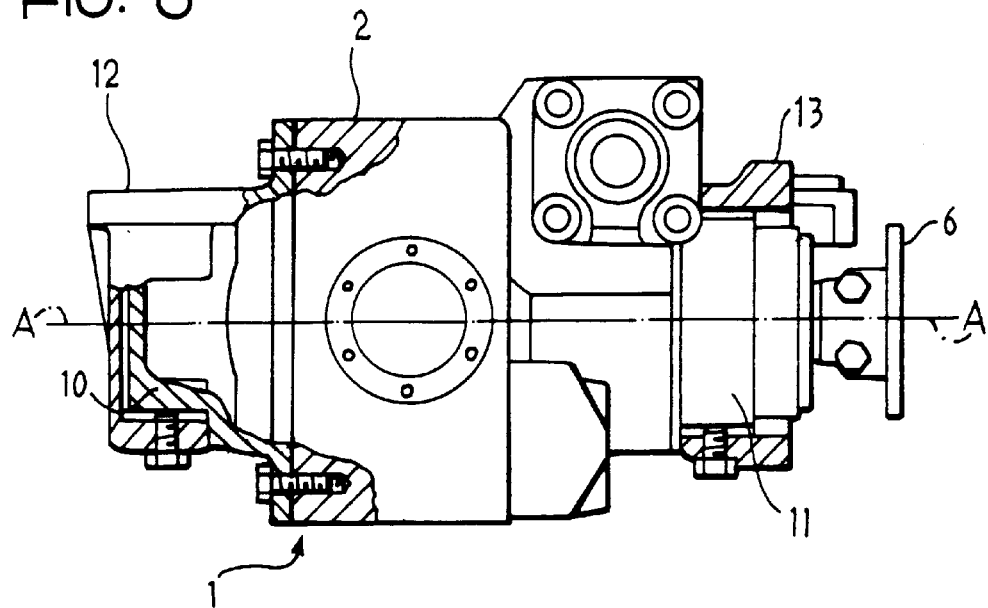
FIG. 6 is a cross-sectional view of the axle of the preceding Figures.

The central body 2 also comprises two opposing attachment formations, both indicated 18, which project laterally and upwards and which are to form one of the two anchoring elements for an actuator 19 of the respective suspension 4a, b; the other anchoring element of the actuator 19 is an eye 20 arranged on the corresponding side body 3a, b. The attachment formations 18 are also used to define respective first seats for receiving corresponding first pins 21, by means of which the first arms 22, or upper arms, of the suspensions 4a, b are hinged to the central body 2. The first arms 22, as shown more clearly in FIG. 5, are hinged by their opposite end to the corresponding side bodies 3a, b by means of pins 26.

Figure 4:
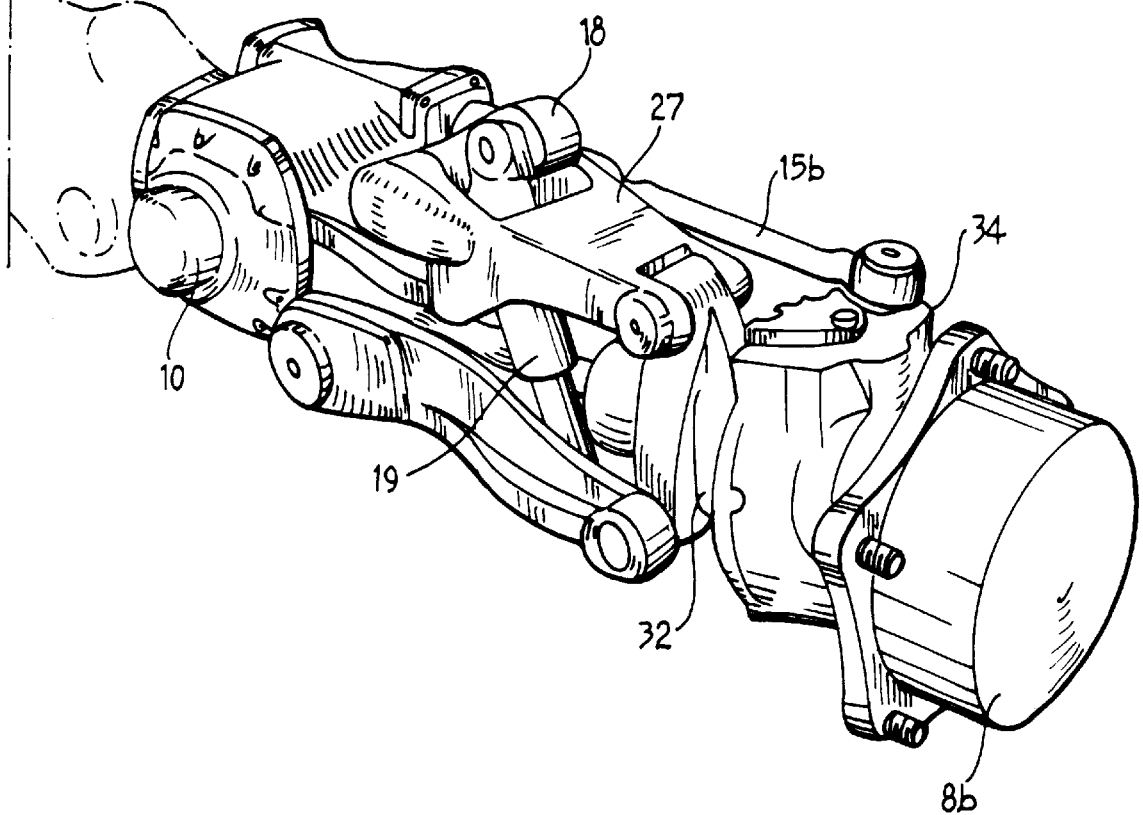
FIGS. 4 and 5 are, respectively, a perspective top view and a side elevation of a detail of the axle of FIG. 1.

Preferably, as illustrated in FIG. 4, the upper arms 22 are connected to one another by a respective crosspiece 27 to form an upper suspension triangle.

Second pins 23 are provided in corresponding second seats at the base of the central body for the articulation of the second arms 24, or lower arms, of the suspensions 4a, b. The opposing ends of the second arms are articulated by means of further pins 25 to the corresponding side bodies 3a, b.

The oscillation between the arms and the pins is effected by means of bush supports or bearings which may contain resilient members. It is typically provided that a torsion bar spring or other spring suspension can be housed in the area of the second seats of the pins 23 in order to act on the second arms, urging them resiliently to swing downwards. In that case, one end of the spring acts on the second arms 24 while the opposite end thereof is attached to a flange 28 which is arranged to close an axial end of the second seat 23 and which can be locked in a predetermined angular orientation by means of screws received in slotted holes in order to impart a suitable resilient prestress to the corresponding torsion spring.

Respective stop abutments indicated 30, 31 arranged to limit the downward swinging of the suspensions 4a, b are provided on the central body 2 and on the upper arms 22.

The side bodies 3a, b each comprise a support element 32 on which the respective wheel hub 8a, b having a structure conventional per se is in its turn mounted in such a manner that it can pivot about a steering axis X.

A bracket 34, to which the corresponding steering arm 15a, b for controlling the steering of the axle is articulated, is arranged on the support of the hub 8a, b. It will be appreciated that this structure lends itself to the production of non-steering axles.

Respective bearings 33 for the rotatable support of the half-shafts 7a, b and of the associated constant-velocity joints with which the half-shafts are connected to the respective wheel hub are arranged in the support elements 32.

An independent suspension is thus provided which acts on each of the wheels associated with the axle. The actuators 19 can then, in their turn, be associated with a hydro-pneumatic circuit which is conventional per se and is illustrated in FIG. 7, and which is suitable for the control of the suspensions in order to vary the attitude of the vehicle, even when the latter is in motion.

Figure 7:
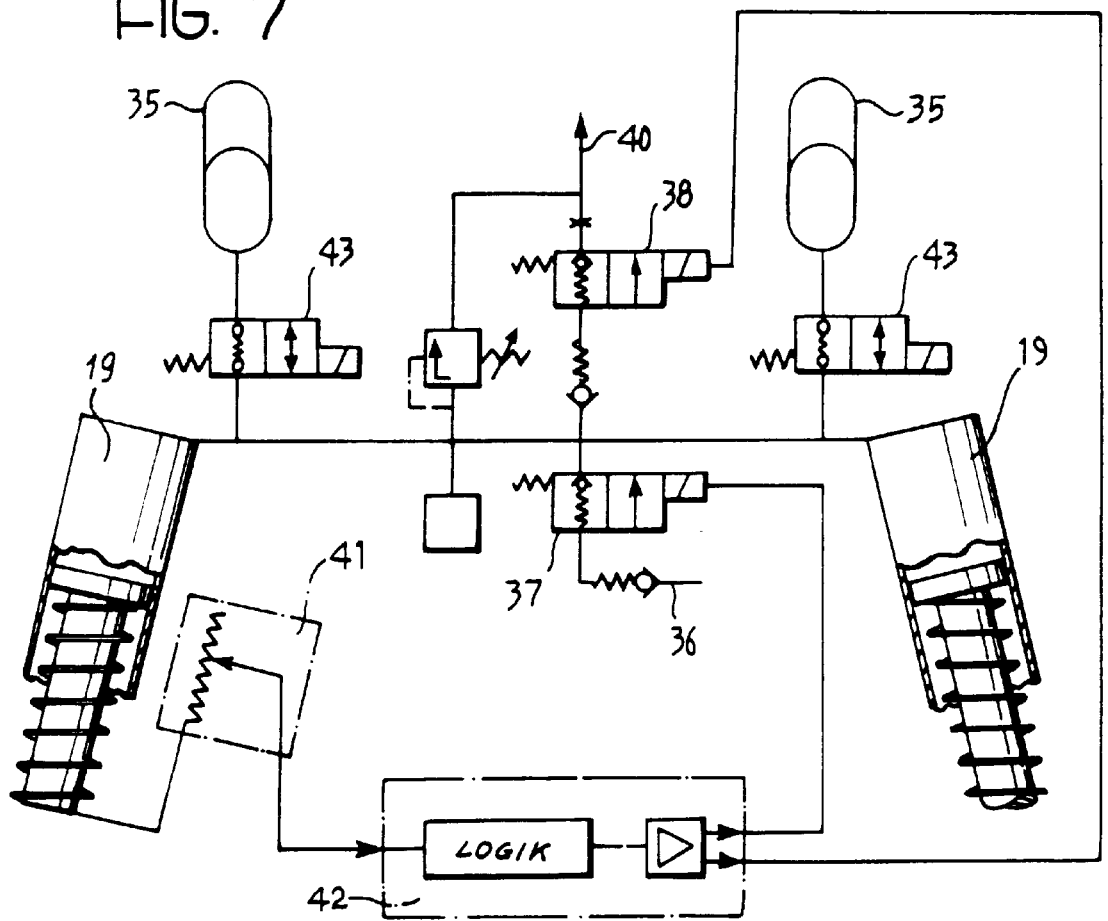
FIG. 7 is a diagrammatic view of the hydraulic circuit associated with the axle of the preceding Figures.

The hydraulic circuit of FIG. 7 comprises, for each actuator 19, a respective gas accumulator 35 which constitutes the resilient member of the suspension by means of the force exerted by a pressurised gas.

Pressurised oil (or other fluid) is supplied by a pump which feeds the pressurised fluid to a duct 36 controlled by two solenoid valves 37, 38. The solenoid valve 37, when open, enables oil to be fed to the accumulators 35 and to the hydraulic circuit 39 by means of which the accumulators 35 are connected to the respective actuators 19; the solenoid valve 38 controls the discharge of oil from the circuit 39 to a duct 40 for direct discharge to a tank (not shown). 41 indicates a position sensor which detects any variation in the position of the suspension whenever the latter is subjected to different charges and transmits a corresponding electrical signal to an electronic control unit 42 which governs the intervention of the solenoid valves 37, 38 until the desired equilibrium is re-established. 43 indicates two operator-controlled solenoid valves which enable the suspension to be locked in a position selected as desired.

The invention thus solves the problem set and achieves numerous advantages over conventional sprung axles. In particular, it is found that all the elements necessary for the installation of the axle in a vehicle designed for traditional equipment are integrated in the axle in such a manner that the axle can be installed on agricultural tractors, 3-wheeled vehicles, and vehicles in general without requiring any substantial intervention for adaptation.

What is claimed is:

1. A sprung axle for vehicles, especially for agricultural tractors, comprising:
   a central body,
   means for attaching the central body to a supporting structure of the vehicle,
   a side body for each wheel, each side body including a respective wheel hub,
   means for connecting each side body to the central body, wherein the connecting means comprise, for each hub, an independent-wheel suspension including suspension arms articulated by one of their ends to the respective side body and by the opposite end to the central body, and also shock-absorbing and/or spring suspension means between the corresponding side body and the central body, the shock-absorbing and/or spring suspension means and the suspension arms being otherwise substantially detached from the supporting structure of the vehicle,
   wherein the attachment means between the central body and the supporting structure of the vehicle constitute an attachment of the swinging type.

2. An axle according to claim 1, wherein the axle is a driving axle.

3. An axle according to claim 2, wherein the central body comprises a closed box-shaped structure suitable for containing a differential unit.

4. An axle according to claim 1, wherein the suspension arms of each suspension define an articulated double-wishbone suspension.

5. An axle according to claim 1, wherein the wheel hubs are mounted on the respective side bodies pivotable about respective steering axes, and steering means are provided between the side bodies and the central body.

6. An axle according to claim 1, wherein the attachment means comprise opposing pin-like formations projecting coaxially from the central body.

7. An axle according to claim 1, wherein the shock-absorbing and/or spring suspension means comprise at least one hydraulic actuator.

8. An axle according to claim 7, wherein the at least one actuator is associated with a circuit for the hydro-pneumatic control of the attitude of the vehicle.

* * * * *